Feb. 25, 1964 A. NOVICK 3,122,233
HIGH SPEED ROTARY MACHINES
Original Filed June 28, 1957 10 Sheets-Sheet 1

INVENTOR.
Abraham Novick
BY
Nolte & Nolte
Attorneys

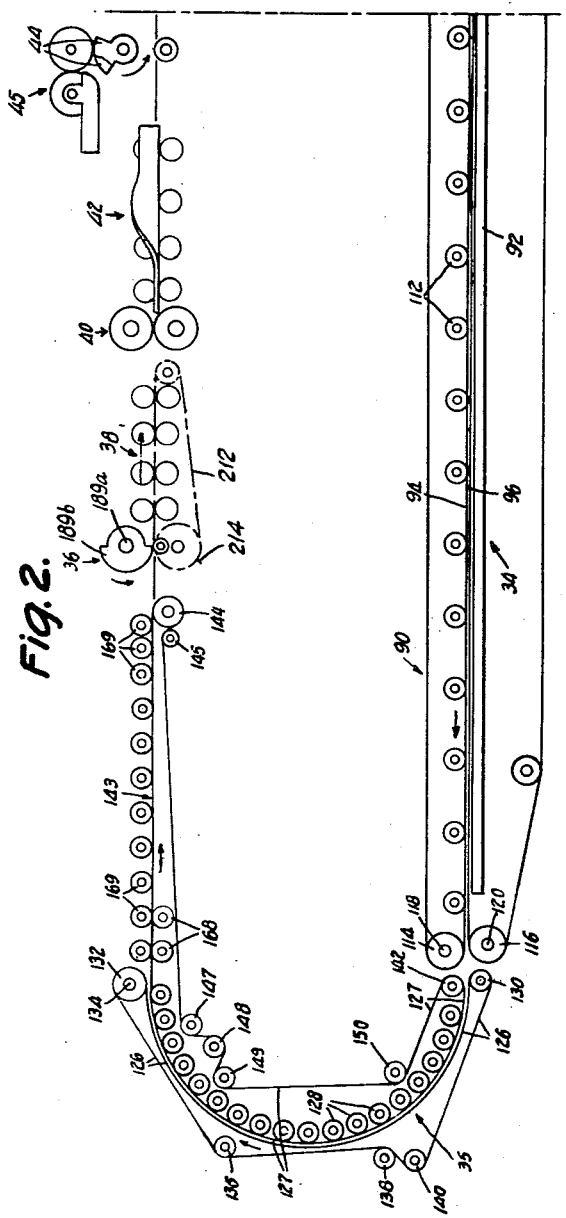

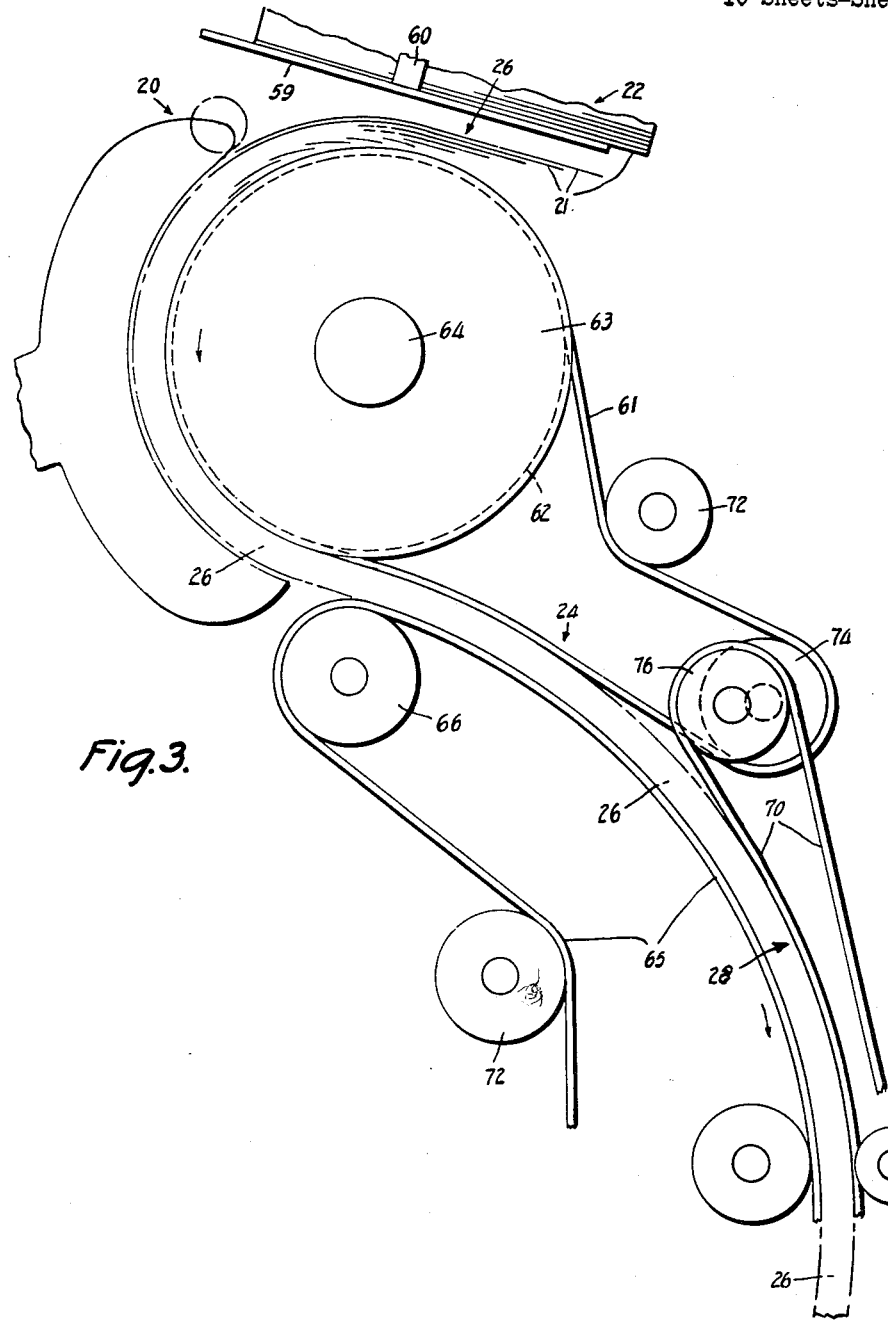

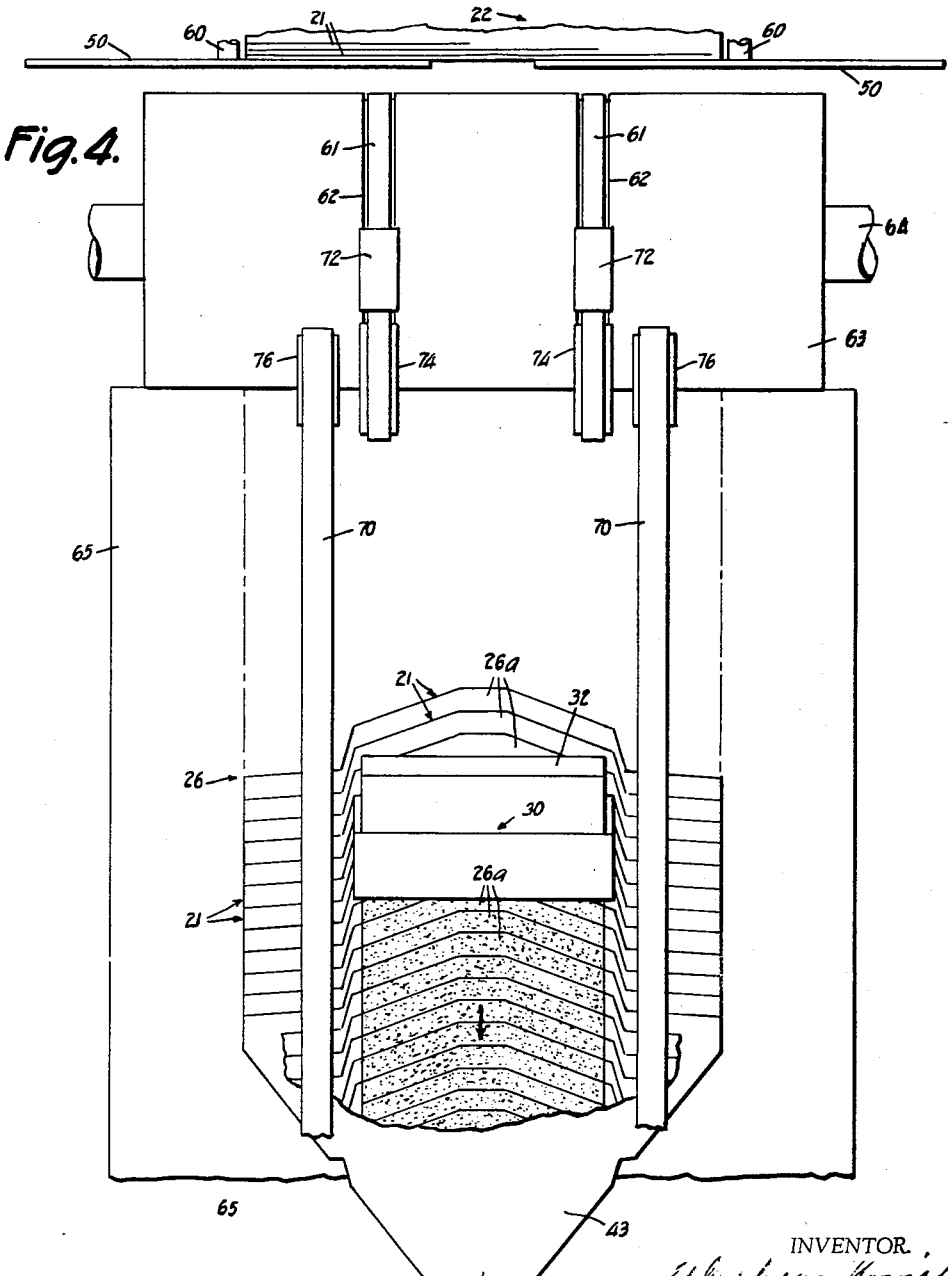

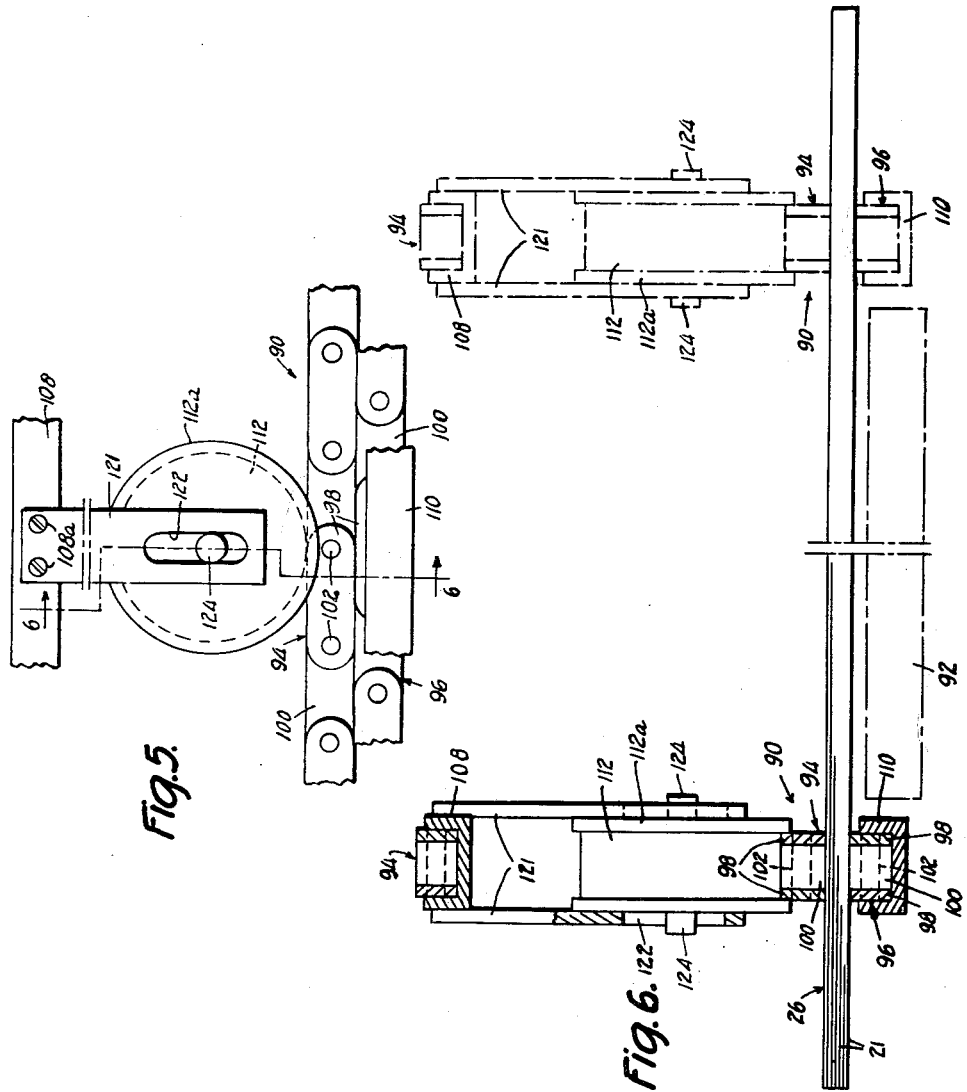

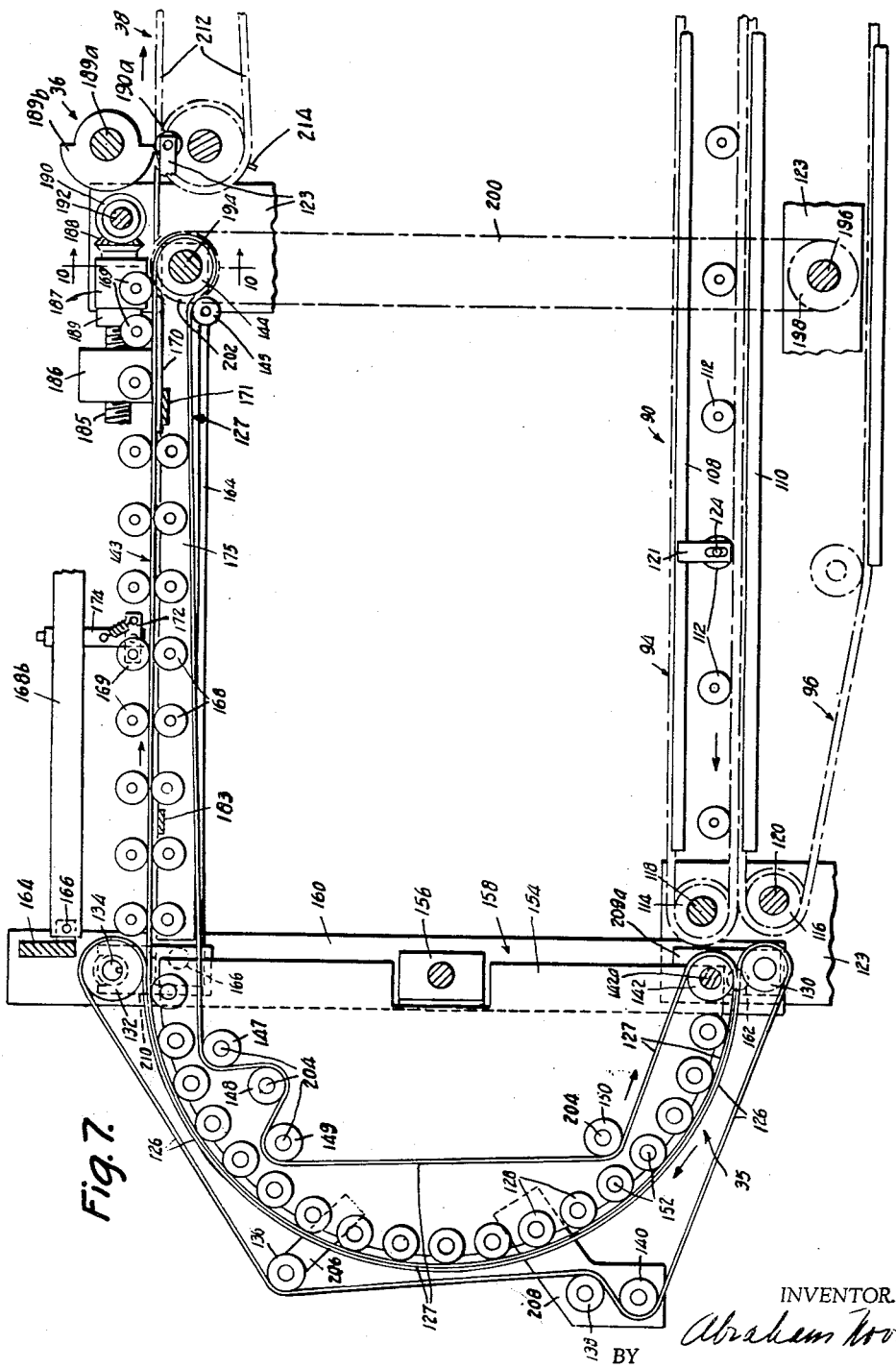

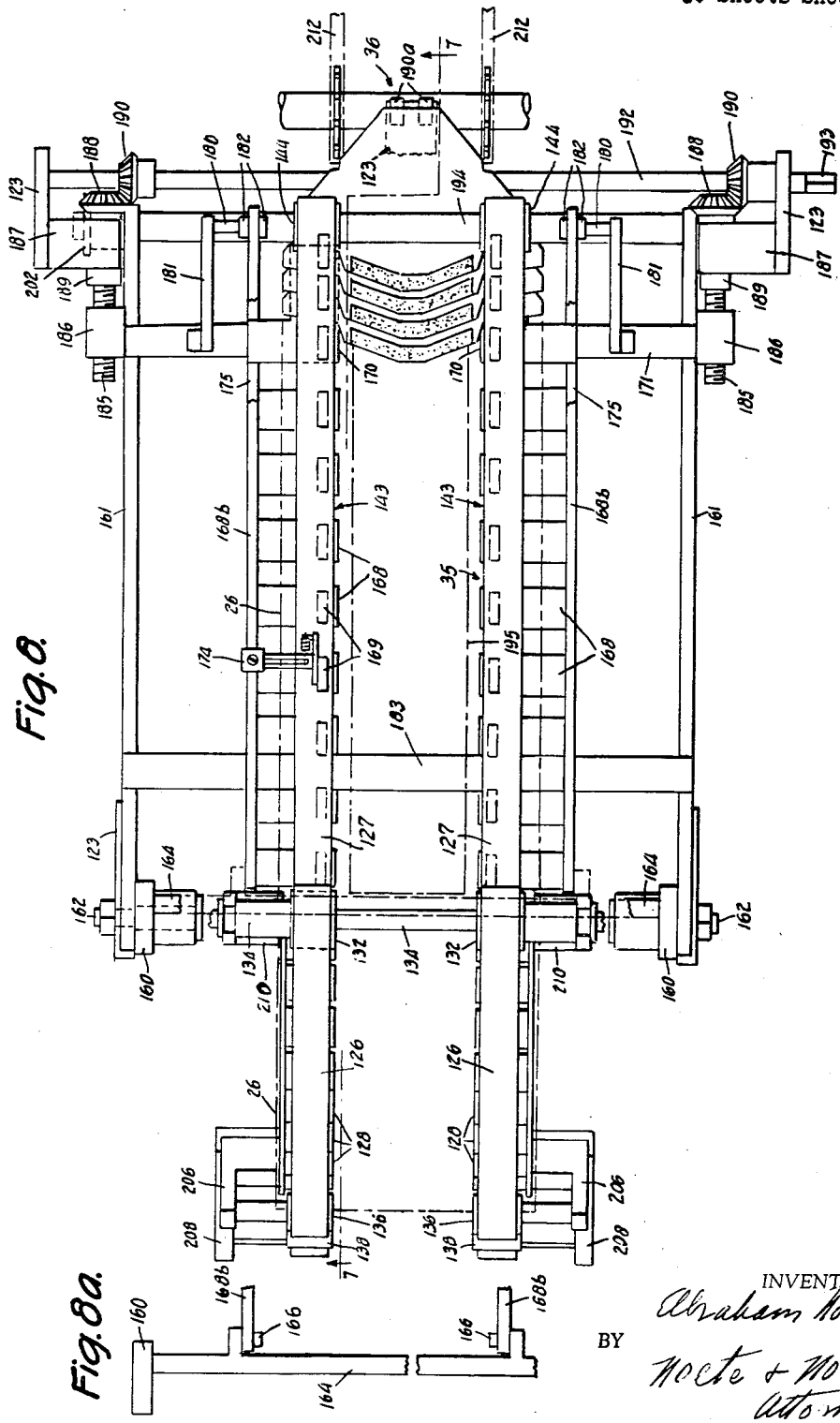

Feb. 25, 1964
A. NOVICK
3,122,233
HIGH SPEED ROTARY MACHINES
Original Filed June 28, 1957
10 Sheets-Sheet 8
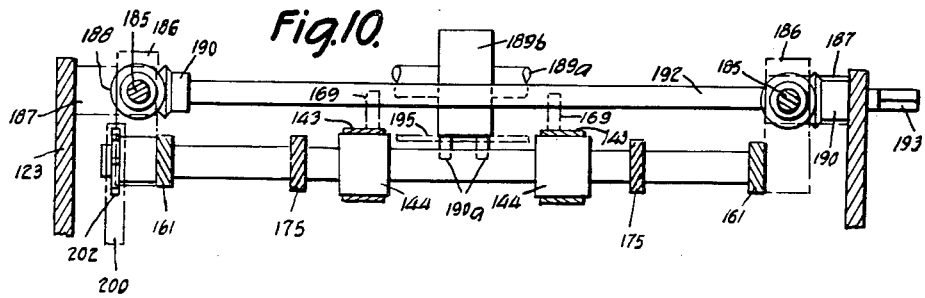
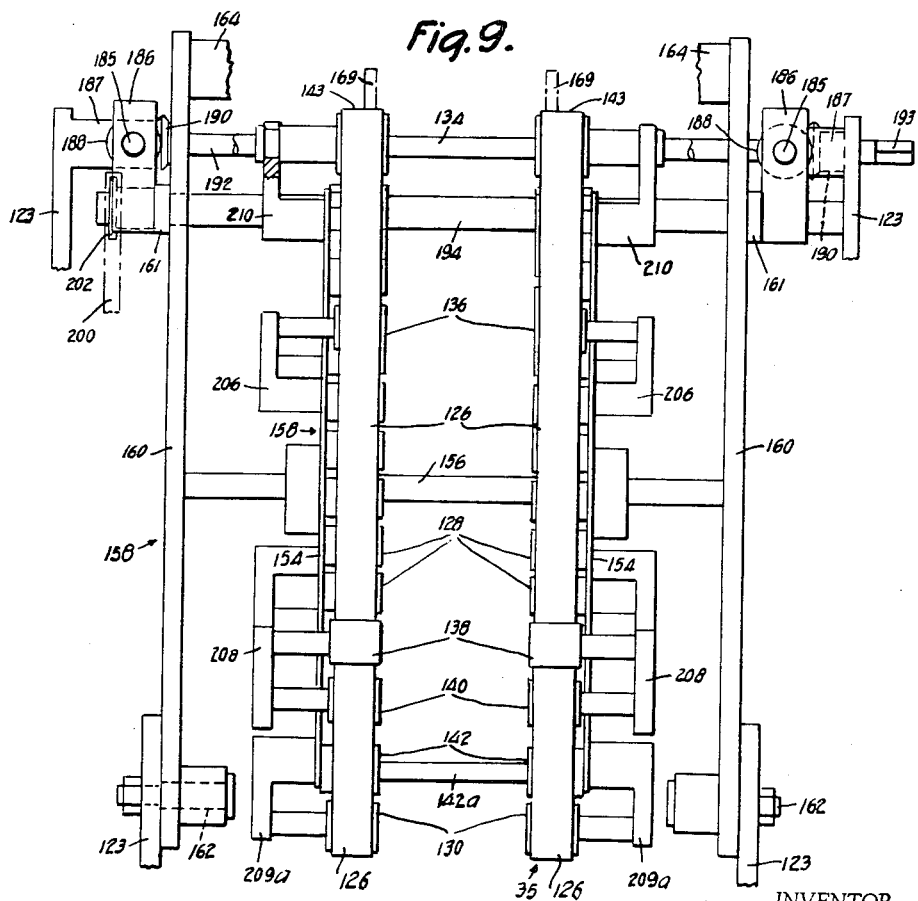
INVENTOR.
Abraham Novick
BY
Nolte & Nolte
Attorneys

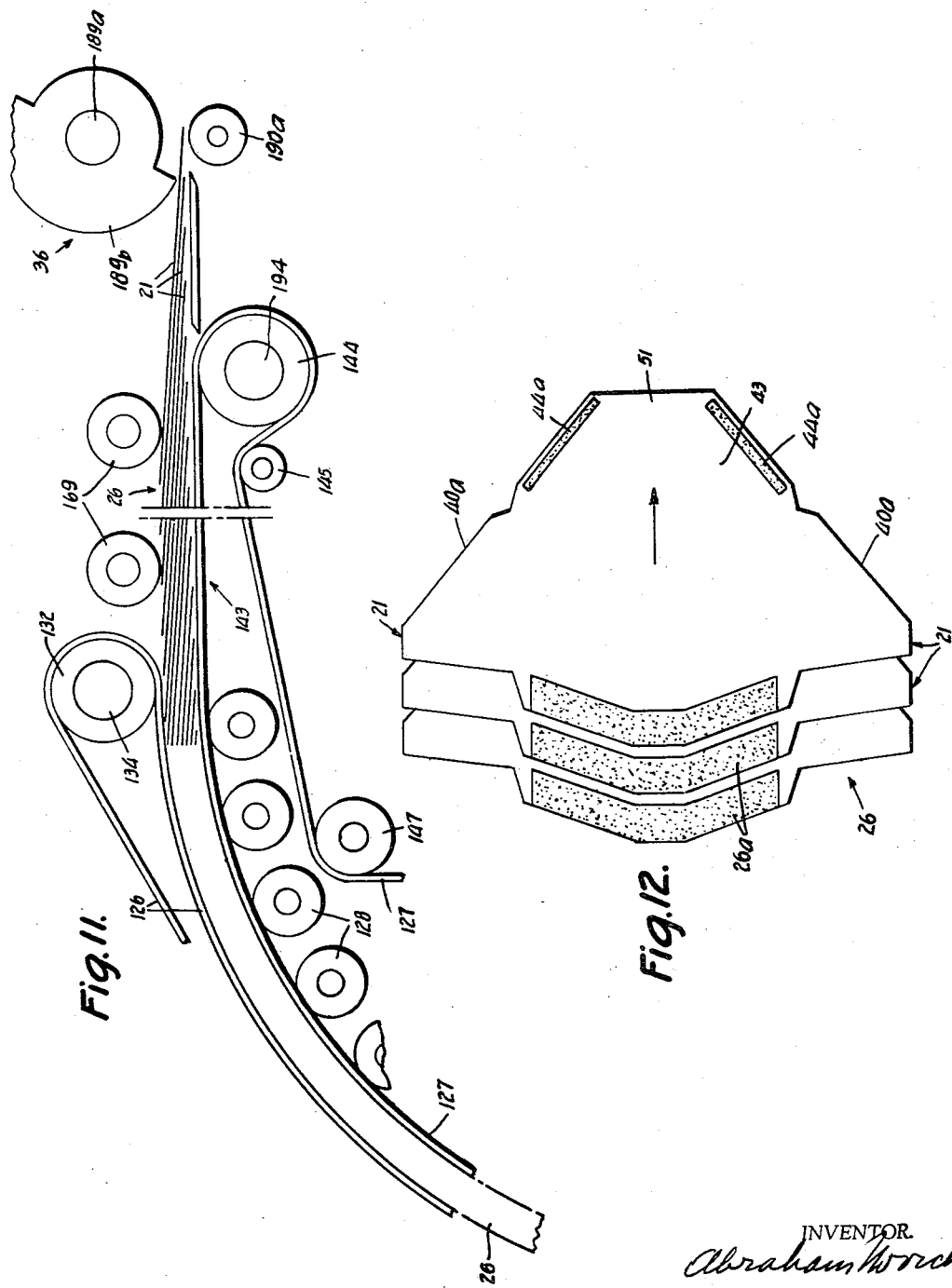

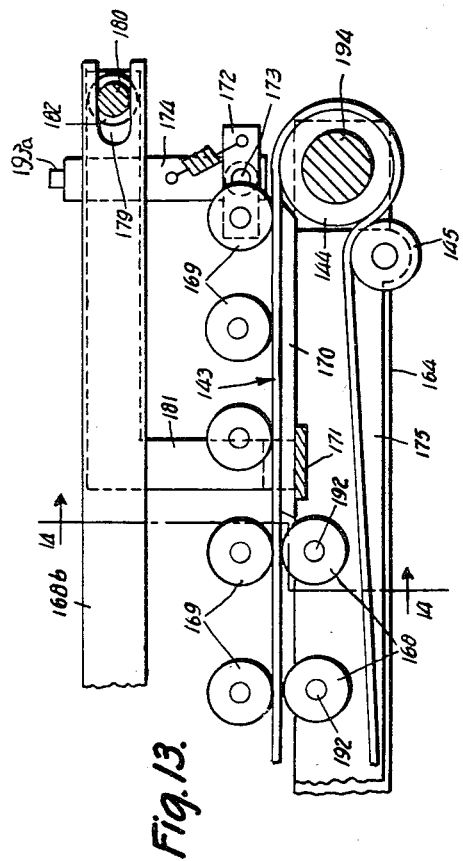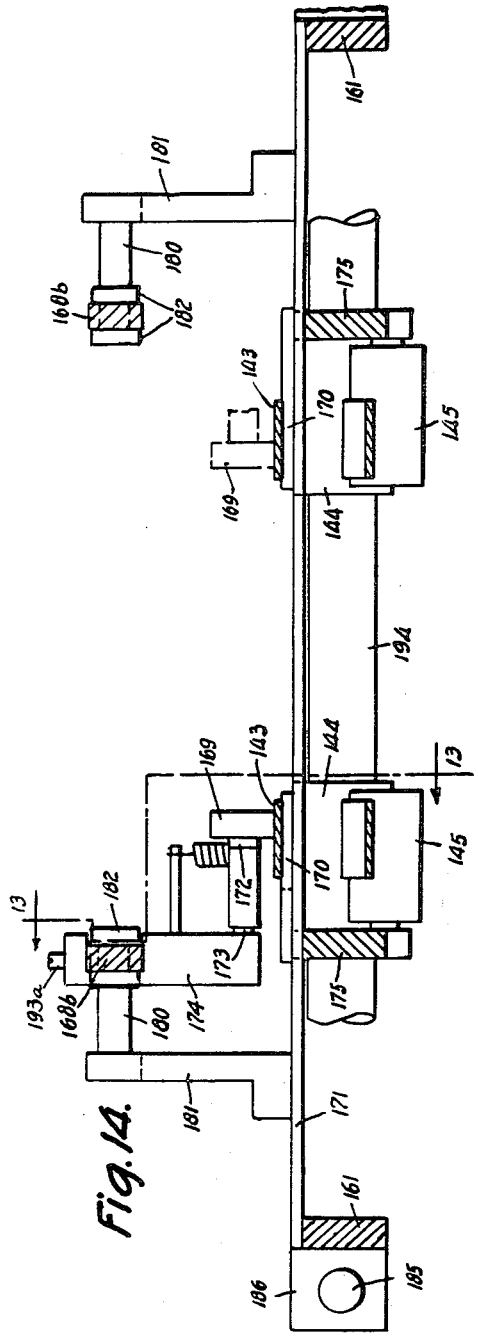

United States Patent Office
3,122,233
Patented Feb. 25, 1964

3,122,233
HIGH SPEED ROTARY MACHINES
Abraham Novick, Flushing, N.Y., assignor to F. L. Smithe Machine Co., Inc., New York, N.Y., a corporation of New York
Original application June 28, 1957, Ser. No. 668,634. Divided and this application Feb. 17, 1959, Ser. No. 795,889
10 Claims. (Cl. 198—165)

This application is a divisional application of application Serial No. 668,634, filed June 28, 1957, now abandoned.

This invention relates to machines for the manufacture of envelopes and more particularly to the kind known as high speed rotary machines. It is an improvement on the machine of my Patent No. 1,807,867 dated June 2, 1931.

A feature of the invention relates to novel means for feeding a band of overlapped envelope blanks through a drier without displacement of the blanks in the band.

A further feature relates to the arrangement of a curved conveyor means to elevate the advanced section of the band of blanks to a higher level for subsequent operations.

A still further feature relates to means to facilitate adjustment of the leading end of the band of overlapped blanks relatively to individualizing means.

Other features and advantages will hereinafter appear.

In the drawings which form part of the specification;

FIG. 2 is a similar view showing the continuation or adjoining portion of the machine;

FIG. 3 is a diagrammatic view, on a larger scale, of a portion of FIG. 1;

FIG. 4 is a diagrammatic elevation of the parts as seen when looking toward the right hand end of the machine in FIGS. 1 and 3;

FIG. 5 is fragmentary side view of the drier conveyor and some of the associated parts;

FIG. 6 is a section taken on the line 6—6 of FIG. 5;

FIG. 7 is a vertical section taken on the line 7—7 of FIG. 8;

FIG. 8 is a plan view of a portion of the machine, some of the parts being omitted;

FIG. 8a is a fragmentary plan view showing some of the parts of FIG. 8;

FIG. 9 is an elevation of the machine as seen when loking towards the left end of the machine in FIG. 7, some of the parts being omitted;

FIG. 10 is a vertical sectional view taken on the line 10—10 of FIG. 7 looking in the direction of the arrows;

FIG. 11 is a diagrammatic side view of the delivery end of the band conveyor and the associated individualizing mechanism;

FIG. 12 is a plan view of a portion of band of overlapped envelope blanks shown in FIG. 11;

FIG. 13 is an enlarged view in section taken on line 13—13 of FIG. 14 showing the delivery end of the band conveyor and the associated feed rollers; and FIG. 14 is vertical section taken on line 14—14 of FIG. 13.

Similar reference characters refer to similar parts in each of the several views.

*Brief Description*

Figure 1:
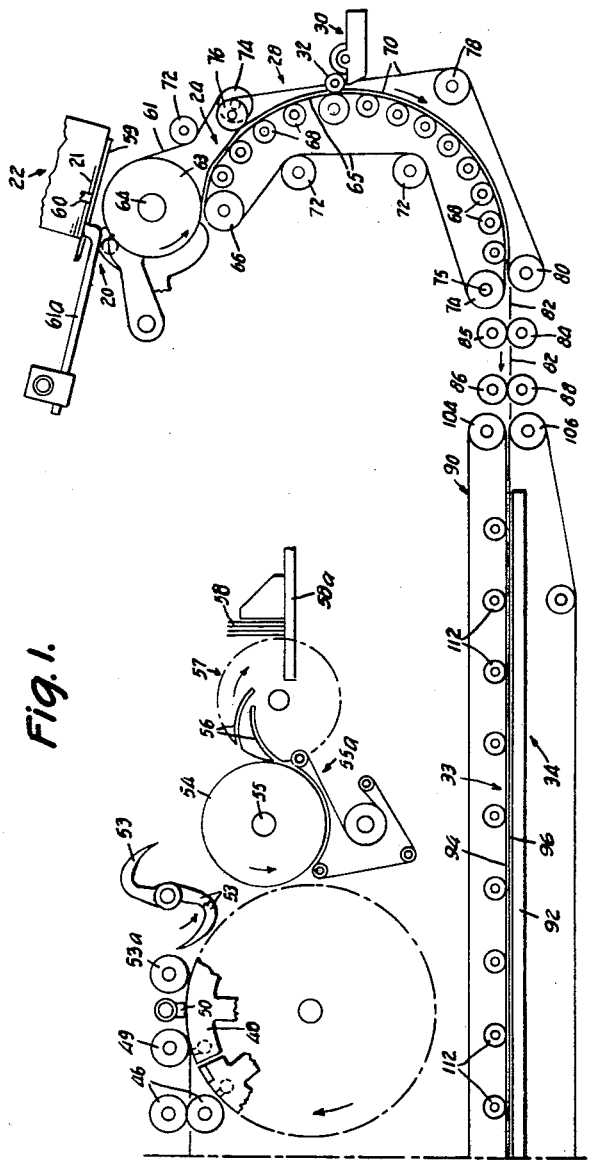
FIG. 1 is a diagrammatic side view of a portion of the machine.

The machine includes various mechanisms such as the feeding means 20 (FIGS. 1 and 3) for feeding envelope blanks 21 from a stack 22 to a conveyor 24 to form a band 26 of overlapped blanks 21 (FIG. 3). The band 26 of blanks is advanced by a curved conveyor means 28. It is moved by the conveyor means 28 to a seal flap gummer 30 having an applicator 32 to apply gum 26a (FIG. 4) to the seal flaps. The band of blanks is next fed by novel conveyor means 33 at a slightly faster speed through a hot air drier 34 to dry the gum 26a on the seal flaps. The band is subsequently fed around a second curved conveyor means or section 35 to a higher level to individualizing mechanism 36. Each blank is then fed to aligning means 38. It is then scored by means 40. Side flaps 40a are then folded over the body of the blank by a plowshear folder 42. After the folding of the side flaps 40a, the bottom flap 43 is supplied with gum stripes 44a (FIG. 12) by diagonal gummer blades 44 of a gummer 45 (FIG. 2). From the gummer 45 the individual blanks are fed to feed rollers 46 (FIG. 1) whereby they are conducted to a large suction cylinder 48, like that shown and described in my copending application, Serial No. 629,902, filed December 21, 1956, now abandoned, and a cooperating feed roller 49. After the blank passes the feed roller 49, a sucker 50 picks up the free end 51 of the bottom flap 43 to initiate the folding of said bottom flap. The folding of the bottom flap 43 is completed by a feed roller 53a cooperating with the cylinder 48. The folding of the envelope blank is subsequently completed by means including rotary fringers 53, and a drum 54 rotatable by a shaft 55 coperating therewith. The drum has conveyor means 55a asociated therewith whereby the folded envelopes are conveyed to slots 56 of transfer means 57 to deposit the envelopes 58 in stack formation upon a table or platform 58a from which they may be conveniently removed by the attendant of the machine for packaging.

*Detailed Description*

The stack 22 of envelope blanks 21 rests mainly on rotary supporting and separating discs 59 which are carried and driven by shafts 60 (FIGS. 1 and 3). The blanks 21 are removed from the stack by feeding means 20 which may be like that shown in my copending application Serial No. 625, 993, filed December 23, 1956 now Patent No. 2,954,225. The feeding means include a suction picker 61a, (see FIG. 1 also) which assists in removing the lowermost blank from the stack and transferring it to the conveyor 24.

The conveyor 24 includes two narrow belts 61 which are spaced apart as in FIG. 4, and are guided in grooves 62 of a cylinder 63 rotated by a drive shaft 64 at a sufficiently slow rate of speed to form the band 26 of overlapped envelope blanks 21, so that the seal flaps 26a are somewhat exposed and trailing. The conveyor 24 includes another belt 65 which is wide and runs over a wide roller 66 located under the cylinder 63. The belt is guided in a curved path by means including stationary, long rollers 68 (FIG. 1). The belt 65 assists in feeding the band 26 to the gum applicator 32 to apply gum 26a to the exposed ends of the seal flaps. The conveyor 24 includes two more narrow belts 70 (FIGS. 3 and 4) to cooperate with the wide belt section 65 for feeding the band 26 past the gummer 30. These belts 70 are spaced apart to clear the gummer 30.

In addition to the grooves 62 in the cylinder 63, the belts 62 are each guided by stationary rollers 72 and 74. The curved portion of the conveyor belt section 65 is guided by the rollers 66 and 68, the belt section 65 is further guided by stationary rollers or pulleys 72' and 74'. To drive the belt 65, the pulley 74 is secured to rotatable drive shaft 75. The narrow belts 70 cooperate with the wide belt 65 and are each guided by three pulleys 76, 78 and 80.

The conveyor 28 extends downwardly in the machine in a curve. The band 26 is conducted from the curved part of conveyor 28 over a horizontal table 82 to feed rollers 85 and 84 which run at a speed slightly faster than that of the band 26. Thus as each blank reaches the rollers 85 and 84 it is advanced in the band to break the adhesive or gum between it and its succeeding blank, which tends to hold the blanks together. The band 26 is then advanced by additional feed rollers 86 and 88 to a conveyor 90 whereby the band 26 is conducted over the drier 92.

The conveyor 90 includes preferably two pairs of belts or chains, 94 and 96, one pair cooperating with each side of the band 26 as in FIG 6. Each chain 94 and 96 is formed by links 98 and blocks 100, connected to one another by pins 102. The effective or feeding reach of the upper chain 94 holds the band 26 against the effective reach of the lower chain 96 to feed or advance the band at a comparatively slow speed, while heat is applied from the drier located under the seal flaps. The conveyor chains 94 and 96 are guided over the sprocket wheels 104 and 106 (FIG. 1) at the right hand end of the conveyor 34. Channel shaped guide rails 108 and 110 (FIG. 7) are provided for the upper reaches 94 and 96 of both the conveyor chains to assist in supporting them.

Rollers 112 have a raised flange 112a about their outer periphery forming a guide groove. This groove prevents lateral displacement of the lower reach of chain 94 in the same manner that the channel shaped guide rail 110 prevents lateral displacement of the upper reach of chain 96.

The lower reaches of the conveyor chains 90 are weighted by rollers 112 to press the reaches and the band 26 firmly against the upper reaches of the lower conveyor chains 96 to effect the feed of the band and prevent accidental displacement of the blanks in the band. Sprockets 114 and 116 (FIGS. 2 and 7) are provided at the left end of the machine to drive the conveyor chains 94 and 96 respectively. These sprockets are secured to drive shafts 118 and 120.

The rollers 112 are each guided by a pair of arms 121 (FIGS. 5 and 6) secured to and depending from the channel bar or guide rail 108. The arms 121 are fastened by screws 186a one at each said guide rails 108 and each arm has an elongated slot 122. Each roller 112 has projecting from its sides a stub shaft 124. These stub shafts engage in the slots 122 to guide the rollers 112 with freedom of up and down movement of the rollers 112 in accordance with different thickness of envelope blanks that make up the band 26 at different times.

The curved conveyor section 35 at the left hand end of the machine (FIGS. 2, 7 and 9) conducts the band 26 delivered from the drier to a higher and convenient level for subsequent operations.

The curved conveyor section 35 includes two narrow outer belts 126 and two narrow inner belts 127 (FIGS 7, 8 and 9). The belts 127 are guided over a series of stationary rollers 128 to conduct the band 26 of blanks in a curved path. The outer belts 126 are guided at their lower ends by stationary pulleys 130 and at their upper ends by pulleys 132 on a drive shaft 134. The belts 126 extend from the pulleys 132 to the stationary guide pulley 136 around guide pulleys 138 and 140 and then to the pulleys 130 and over the belts 127 back to pulleys 132. The inner belts 127 extend from stationary pulleys 142, on a shaft 142a, around the series of guide pulleys 128 then to form a horizontal extension 143 of the conveyor 35. The belts 127 then extend around drive rollers 144, guide rollers 145 and then around rollers 147, 148, 149 and 150, and back to pulley 142.

The pulleys 128 of each set which guide the belts 126 and 127 are supported by pivot pins 152 on one of two segmental plates 154, one plate at each outer side of the rollers 128. The plates 154 are connected by a cross-bar 156. This bar forms with the plates 154 part of a supporting frame 158 having two vertical end bars 160 to which the bar 156 is secured. The vertical bars 160 are supported at their lower ends each by a pivot stud 162 to swingingly support the frame 158 on the main frame 123 of the machine.

A cross-bar 164 is rigidly connected to and at the upper ends of the vertical bars 160. This cross-bar 164 has pivotally connected to it by studs 166 two horizontal bars 168b supporting pressure rollers 169.

The horizontal extensions 143 of the conveyor belts 127 are guided for the greater part by rollers 168 over which the belts run freely. The band 26 of blanks is carried between the upper reaches of the horizontal conveyor sections 143 and pressure rollers 169.

Near the rollers 144 the conveyor sections 143 run over short guide plates 170 secured to a cross-bar 171 fastened to the horizontal end bars 164. The belt sections 143 pass over plates 170 and several of the pressure rollers 169 cooperate to feed the band 26.

Each pressure roller 169 is rotatably supported by a spring biased lever 172 pivoted on a pin 173 (FIG. 13) of a post 174.

There is one set of pressure rollers 169 near each side of the web 26. The posts 174 of each set of rollers 169 are detachably supported one one of the horizontal bars 168b.

To maintain the effectiveness of the spring pressed rollers 169, the ends remote from their pivots 166a of the bars 168b are held down. To this end each bar 168b is provided with a slot 179 to embrace a pin 180 on a bracket 181 secured to the cross-bar 171. Each pin 180 is provided with collars 182 to guide the bars 168b between them. Another cross-bar 183 similar to the one designated 171 extends from one to the other of the end bars 161.

The means for adjusting the position of the conveyor 35 so that the leading edge of each blank reaches the individualizing means 36 at the proper time will now be described. For this purpose two screws 185 (FIGS. 7 and 8) are threaded into blocks 186, one on the outer side of each bar 171. Each screw 185 rotates freely in a stationary block 187 on the machine frame 123, and is held axially on the block 187 by a bevel gear 188 on the screw 185 at one side of the block and a collar 189 fixed on said screw at the other side of the block 187. Meshing with the gears 188 are bevel gears 190 secured to a shaft 192 supported in the machine frame 123. The shaft 192 is provided with a square end 193 for attachment of a handle (not shown) whereby the shaft may be rotated. Rotation of the shaft 192 drives the screws 185 to shift the conveyor frame 158 about pivot studs 162 to carry the band of blanks 26 therewith and its leading edge to the appropriate position.

The individualizing means 36 includes a pull-out segment 189b and cooperative rollers 190a. The distance between bight of the pull-out segment 189b and its cooperative rollers 190a to the nearest holddown roller 169 should always be approximately equal to the distance from the leading edge of the seal flap to the trailing edges of the side flap of the blank, so that an instant after the leading edge of the blank reaches the bight of the pull-out segment 189b of individualizer 36 the trailing edge of the blank becomes free of the nearest holddown roller 169. In addition to the adjustemnt effected by the adjusting screws 185, of the leading edge of the band 26 as above described, provision is made for adjustment of the position of the nearest holddown roller 169 in accordance with different sizes of envelope blanks which may constitute the band at different times. For this purpose the roller supporting post 174 may be adjusted lengthwise of its supporting bar 168. A set screw 193a holds each post 174 (FIG. 13) on the bar 168a to maintain the roller 169 in its adjusted position.

There are two sets of rollers 168, one set for each belt section 127. The rollers of each set are pivotally supported by pins on the bar 175. Both bars 175 are rigidly carried by supporting cross-bar 171 and the cross-bar 183 similarly supported on the horizontal end bars 161.

A guard plate 195 (FIG. 8) suitably supported between the two sets of rollers 168 may be provided to prevent the blanks 21 from sagging into the space between the conveyor sections 143.

The drive rollers 144 (FIGS. 7 and 8) for the conveyor sections 143 are secured to a shaft 194 which is carried by the right-hand ends of the horizontal bars 164 (FIGS. 8, 7 and 13). A drive shaft 196 supported in the lower part of the main frame 123 has fixed thereon a sprocket 198 to drive chain 200 engaging a sprocket 202 secured to the shaft 194 to rotate the latter. This arrangement permits freedom of shifting of the horizontal conveyor section 143.

To drive the shaft 134 which carries the pulleys 132 for the conveyor belt 126 there may be secured to said shaft 134 a sprocket, which may be driven by a chain similar to the drive chain 200 for the shaft 194.

The guide rollers 147, 148, 149 and 150 for each conveyor belt 127 are carried by the pivot studs 204 on the segmental plate 154. The rollers 136, 138 and 140 which assist in supporting and guiding the conveyor belts 126 are also carried by the segmental plates 154, but through the means of brackets 206 and 208 secured to said plates 154. The brackets 206 support the roller 136 and the brackets 208 support the rollers 138 and 140. The pulleys 142 for the conveyor belt 127 are carried by the shaft 142a which is supported by bracket 209a. The brackets 209a also support the pulleys 130 for the conveyor belts 126. All of the brackets 206, 208 and 209a are L-shaped (FIGS. 8 and 9) to extend around and clear the opposite side edges of the band 26 of blanks.

The segmental plates 154 are connected at their upper ends to the shaft 134 by brackets 210 which are slotted for convenience of assembly to embrace the drive shaft 134. The brackets 210 are also L-shaped as in FIG. 9 to clear the side edges of the band 26 of blanks.

The individualizer 36 may be like that shown in the above mentioned U.S. Patent No. 1,807,867 and includes two pull-out segments 189b cooperating with stationary feed rollers 190 as above mentioned, supported on the machine frame 123. The segments 189b are secured to a stationary rotating shaft 190a.

The aligning means 38 may also be like that shown in above mentioned patent (U.S.) No. 1,807,867, and includes two chains 212, each chain having a series of pins 214 (FIG. 7) thereon to engage trailing edges of the blanks to align them and advance them to the scorer 40 which may be similar to that of my U.S. Patent No. 2,101,268 dated December 7, 1937.

The side flap folder 42 which is next in the order of events may be like that shown in U.S. Patent No. 1,839,492, dated January 5, 1932.

The gummer 45 to which each blank 23 is next conducted may be like that of U.S. Patent No. 1,961,162 dated June 5, 1934. It includes the diagonally disposed blades 44 by which gum strips 44a (FIG. 12) are applied to the side edges of the bottom flap 43 of the blank 21.

Each blank 21 is conducted further to means including the suction cylinder 48 for to fold the bottom flap in a manner above mentioned, and the completely folded envelopes are deposited by the transfer 51 to the platform 58a.

I have described what I believe to be the best form of embodiment of my invention. I do not wish, however, to be confined to the embodiment shown, but what I desire to cover by Letters Patent is set forth in the appended claims.

I claim:

1. In a machine for making envelopes, the combination of a main frame, a conveyor, said conveyor including two inner belts and two outer belts to cooperate with the inner belts to conduct a band of overlapped envelope blanks from a low level to a higher level, rollers to guide said belts in a curved path, each inner belt having at its upper end a horizontal extension, rollers to support a major portion of said extension, driving means for the outer belt, driving means for the inner belt, a swingable frame including two vertical side bars, and a tie bar between them, pivots, one at the lower end of each side bar, whereby the swingable frame is supported on the main frame, side plates to support the guide rollers, said side plates being supported on said tie bars, horizontal bars, one at each side of the machine, a bar supported between and at the upper ends of the vertical bars, hold down spring loaded rollers to cooperate with the horizontal extension of the inner belt, means to drive the inner belt, and means to adjust the side arms lengthwise to vary the position of the delivery end of the inner belt.

2. In a machine for making envelopes, the combination of a main frame, a conveyor, said conveyor including two inner belts and two outer belts to cooperate with the inner belts of the conveyor, to conduct a band of overlapped envelope blanks from a low level to a higher level, rollers to guide said belts in a curved path, each inner belt having at its upper end a horizontal extension, rollers to support said extension, driving means for the outer belt, driving means for the inner belt, a swingable frame, pivots, one at each side of said frame whereby the swingable frame is supported on the main frame, said frame including side plates to support the guide rollers, horizontal bars one at each side of the machine, a bar pivotally supported between and at the upper ends of the vertical bars, a hold down roller to cooperate with the horizontal extension of the inner belt, means to drive the inner belt and means to adjust the side arms lengthwise to vary the position of the delivery end of the inner belt.

3. In a machine for making envelopes including a frame, means supported by said frame for conveying blanks along a prescribed path on a lower level, means supported by said frame for conveying blanks along a prescribed path on an upper level, intermediate conveying means extending between said lower and upper blank conveying means for conveying blanks therebetween, means pivotally supporting one end of said intermediate conveying means at one of said levels, and adjustment means connected to said intermediate conveying means to vary the position of its other end in relation to the end of the blank conveying means adjacent thereto.

4. In a machine for making envelopes according to claim 3, wherein said intermediate conveying means is pivotable about a horizontal axis and wherein said adjustment means includes means for moving one end of said intermediate conveying means toward and away from said upper level blank conveying means.

5. In a machine for making envelopes according to claim 3, wherein said intermediate conveying means includes belt means and spaced supporting plates and belt guide rollers rotatably supported by said plates.

6. In a machine for making envelopes according to claim 5, including a drive shaft rotatably mounted on said frame, and sprocket means connecting said drive and at least one of said rollers to move said conveyor.

7. A conveyor mechanism for conveying blanks from a blank conveyor at one level to another blank conveyor at another level comprising a supporting frame, a conveyor end plate pivotally supported at one end on said supporting frame, a plurality of pulleys rotatably supported on said end plate, a conveyor belt trained to run on said pulleys and extending in a curved path between the levels of the blank conveyor, and means connected to said supporting plate to rock said plate about its pivot whereby to vary the spacing between said conveyor and at least one of said blank conveying levels and thereby change the effective length of the path of said conveyor mechanism between the respective levels.

8. A conveyor according to claim 7, wherein said conveyor supporting plate is pivotally mounted at its lower end.

9. A conveyor according to claim 7, including at least one roller extending outwardly horizontally from said conveyor end plate at one level thereof, said belt being trained to extend outwardly and run around said roller, and means to drive said outwardly extending roller.

10. In a machine for making envelopes including a frame, and means supported by said frame for conveying blanks along a prescribed path on an upper level and at a lower level, the improvement comprising a conveyor including belt means extending between said levels for conveying blanks from one of said levels to the other of said levels, said conveyor being pivotally supported at one end to said frame and including a portion extending outwardly at one of said levels, pressure roller means bearing downwardly on the outwardly extending portion of said conveyor and means for adjusting the position of said pressure rollers.

References Cited in the file of this patent

UNITED STATES PATENTS

| | | |
|---|---|---|
| 1,313,218 | Jackson | Aug. 12, 1919 |
| 1,668,967 | Labombarde | May 8, 1928 |
| 2,093,437 | Gwinn | Sept. 21, 1937 |
| 2,173,171 | Labombarde | Sept. 19, 1939 |
| 2,563,184 | Naylor | Aug. 7, 1951 |
| 2,578,592 | Pile | Dec. 11, 1951 |
| 2,580,469 | Schwartz | Jan. 1, 1952 |
| 2,604,972 | Schmied | July 29, 1952 |
| 2,703,169 | Beyer | Mar. 1, 1955 |
| 2,714,440 | Forty | Aug. 2, 1955 |
| 2,746,364 | Welsh | May 22, 1956 |
| 2,812,079 | Carnine et al. | Nov. 5, 1957 |
| 2,978,095 | Jenike | Apr. 4, 1961 |

FOREIGN PATENTS

| | | |
|---|---|---|
| 768,504 | Great Britain | Feb. 20, 1951 |